July 18, 1944.　　　　W. R. FRANK　　　　2,353,659
REAR WHEEL MOUNTING FOR PLOWS
Filed Dec. 13, 1941　　　3 Sheets-Sheet 2

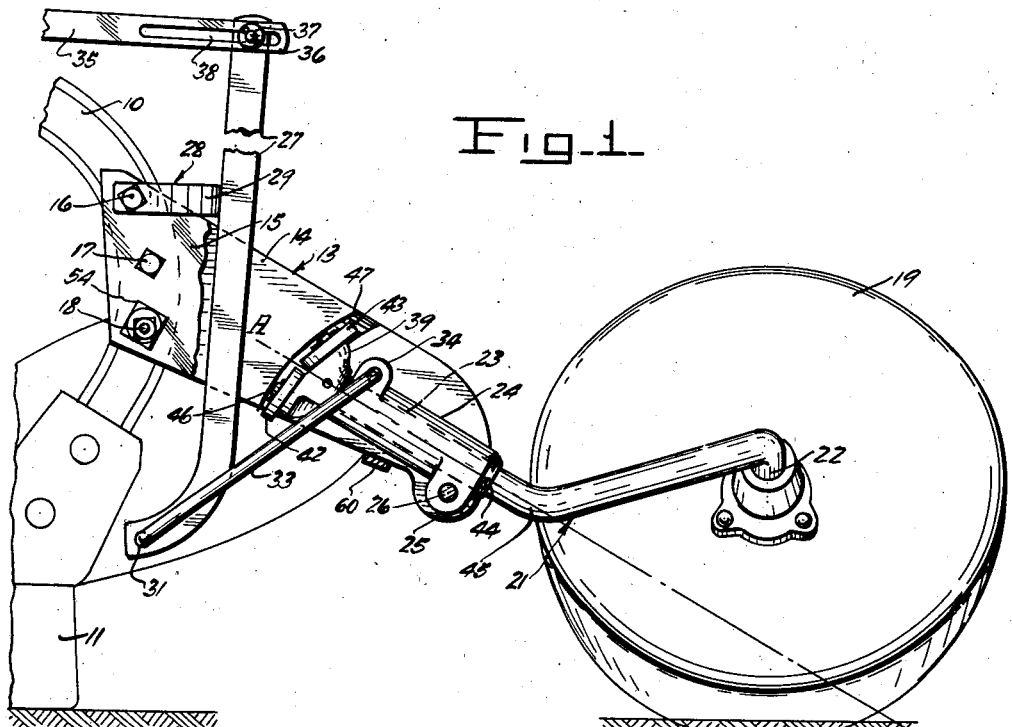

Caster 360°

Inventor
WILLIAM R. FRANK
By Carlsen & Hoyle
Attorneys

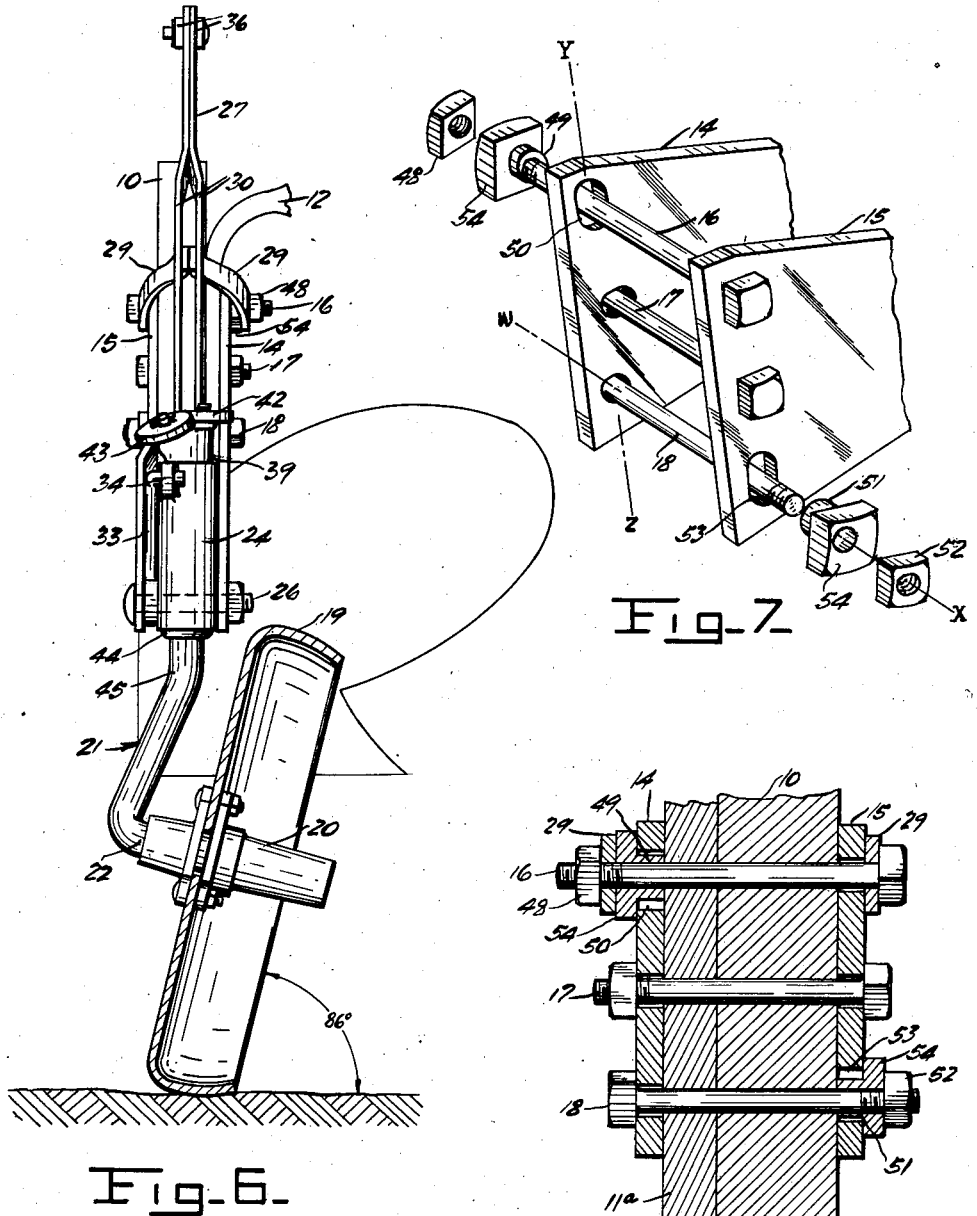

Patented July 18, 1944

2,353,659

UNITED STATES PATENT OFFICE 2,353,659

REAR WHEEL MOUNTING FOR PLOWS

William R. Frank, Moline, Ill., assignor to Minneapolis-Moline Power Implement Company, Minneapolis, Minn., a corporation of Delaware Application December 13, 1941, Serial No. 422,831

15 Claims. (Cl. 97—127)

This invention relates generally to improvements in plows and more specifically to an improved mounting and operating means for the rear or furrow wheels of such implements.

In implements of the type here in mind, known to those skilled in the art as riding or tractor plows, there is usually provided a rear wheel movably mounted for vertical swinging adjustments on the plow frame and adapted to run in the furrow behind the plow during the plowing operation. This wheel is arranged to be moved downwardly to raise the plow frame and draw the plow body, or bodies, from the ground to raised transport positions, or moved upwardly to lower the frame and plow body or bodies to working or plowing positions and adjust the working depth thereof. Such raising and lowering movements are of course a part of similar movements applied to the main supporting wheels for the plow and are carried out by connection to the main crank axle of the plow in the usual manner.

In the construction, mounting and operation of such rear or furrow wheels there are a number of desiderata having profound effect on the proper operation of the plow and which will now be enumerated.

The purpose of raising the plow is, of course, to permit it to be turned and maneuvered at the end of the furrow and to permit transport to and from the work. To facilitate such operations the rear wheel must caster when it is in transport position in order to properly follow the maneuvering of the plow and heretofore such wheels with which I am familiar have had only a limited castering action thus making it extremely difficult to back up the plow or move it rearwardly as frequently is required. On the other hand the wheel must be restrained against castering or lateral movement in plowing position so that it will properly follow the furrow side. It is also very desirable to change the vertical angle or "cant" of the wheel as it is raised or lowered so that it will stand nearly straight, or run about a substantially horizontal axis, when transporting, and incline to a proper working angle in the furrow in plowing position as will be readily evident. The mounting furthermore should be such as to permit minor adjustments of the wheel in both vertical and horizontal planes to thereby facilitate the adjustments of the working angles of the plow body or bodies. Such adjustments are known to those skilled in the art as "suction" and "land pressure" adjustments.

Having in mind the foregoing facts it is the primary object of my invention to provide a rear wheel structure having means for positively restraining the wheel against lateral movement while in plowing position but releasing the wheel for complete turn, or three-hundred and sixty degree caster, in transport position, thus permitting free maneuvering of the plow either in forward or rearward directions. Another object is to provide a wheel mounting of this kind so arranged that the vertical angle of the wheel will automatically adjust itself to proper and best degree as the wheel is raised and lowered. A further object is to provide a mounting having novel and effective means for adjusting working angles of the plow body or bodies without effect on the normal operation of the raising and lowering mechanism. Still another object is to provide a rear wheel mounting of simple and practical nature which will positively guide and direct the wheel into laterally restrained, plowing position from any angle to which it may have been castered in transport position, and which will largely overcome the twisting or torque effect of the wheel as it approaches plowing position to thus further aid in the proper guiding of the wheel into laterally restrained condition. Still another object is to provide an operating mechanism for the rear wheel which will operate to cause the front of the plow to raise first so that the plow body or bodies will have a tendency to run out of the ground and thus lift easier, and which, on the other hand, will cause the rear of the plow to lower first thus protecting the points of the plow bodies from injury due to striking the ground.

These and other more detailed and specific objects will be disclosed in the course of the following specification, reference being had to the accompanying drawings, in which—

Fig. 1 is a side elevational view, partially broken away, of my improved rear wheel mounting arranged on the rear portion of a plow and showing the parts in working or plowing position.

Fig. 2 is a rear elevational view of the structure of Fig. 1.

Fig. 3 is a fragmentary side elevation of parts of the rear wheel mounting.

Fig. 6 is a rear elevational view of the mounting as it appears in Fig. 4, the wheel itself being shown in diametrical section.

Fig. 7 is an enlarged perspective view of forward ends of the mounting plates and associated parts illustrating the manner in which said plates are adjusted in vertical and horizontal planes.

Fig. 8 is an enlarged sectional view taken substantially along the line 8—8 in Fig. 4.

Figure 4:
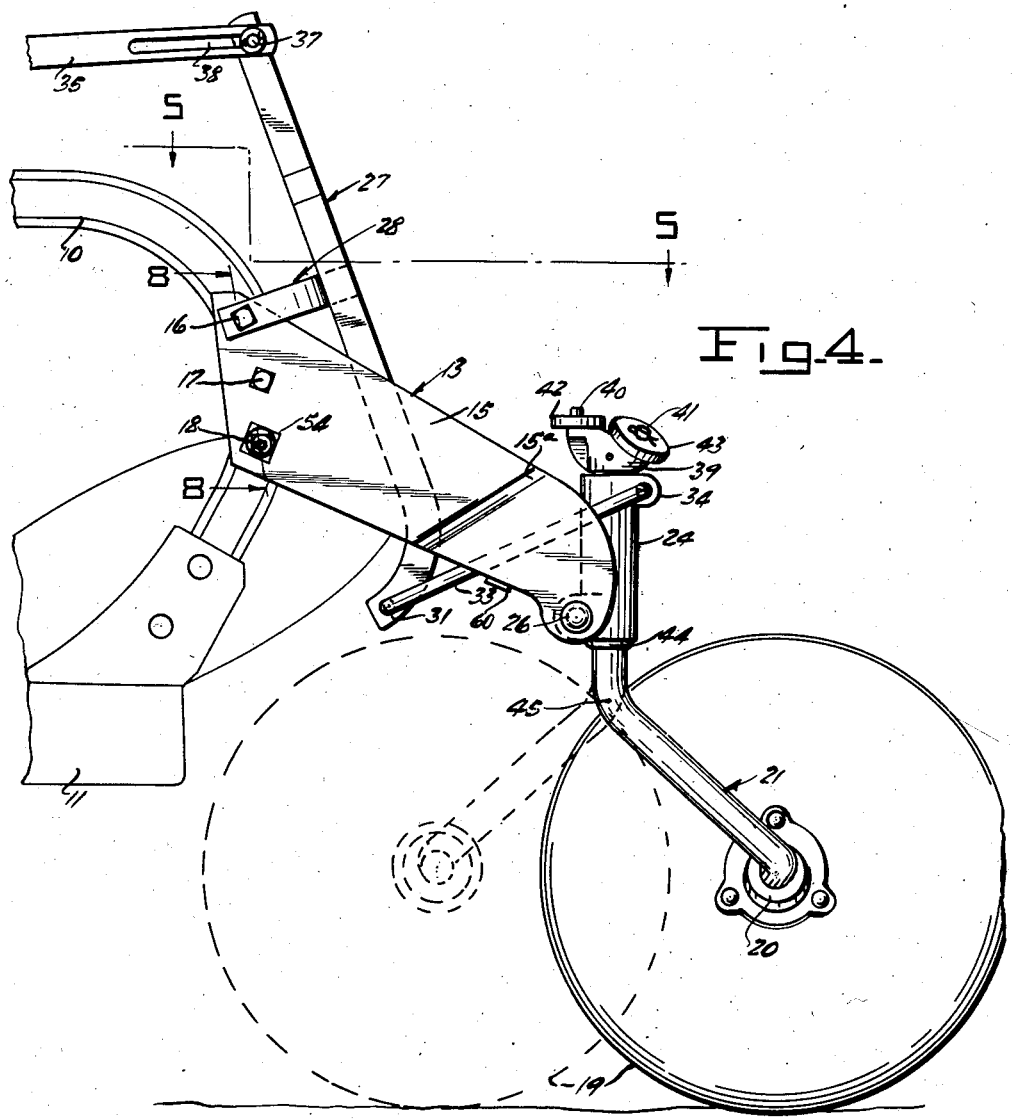
Fig. 4 is a view similar to Fig. 1 but showing the parts in transport position, and also showing the wheel in a forwardly castered position in dotted lines.
Figure 5:
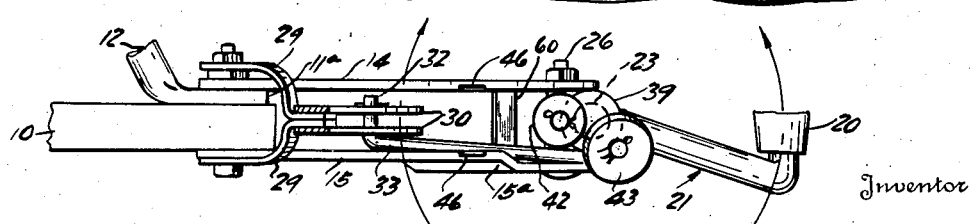
Fig. 5 is a fragmentary top plan and sectional view of the structure of Fig. 4, taken along the line 5—5 therein.

Referring now more particularly and by reference characters to the drawings, 10 designates the plow beam, and 11 a plow body affixed thereto. These parts are located at the rear of the plow as a whole, the beam 10, and other beams if more than one plow body is used, extending forwardly and being connected and supported by the usual crank axles and ground wheels (not shown). A cross brace 12 extends from the beam 10 forwardly and laterally to connect to such other beams, if used, and said brace has its rear end 11a turned downwardly alongside the downwardly curving portion of the beam 10 to be bolted thereto.

My improved mounting assembly comprises a mounting member or carrier designated generally at 13 and consisting of spaced rigid side or guide plates 14—15 which form an upright guideway and are extended rearwardly and downwardly from the beam 10, being secured at forward ends at either side of the beam by three bolts 16, 17 and 18. Said bolts clamp the plates to the beam and also pierce the brace end 11a to hold it in place as clearly shown. The rear or furrow wheel 19 is journaled by a bearing 20 upon the rear wheel axle or supporting member 21 which has a pintle portion 22 for this purpose and the axle extends forwardly from the wheel with an end 23 journaled or swiveled in a sleeve or sleeve casting 24 which acts as a bearing and support for the axle. Said sleeve or bearing 24 has an apertured lug 25 on its lower end which is pivoted upon a horizontally and transversely extending pin or bolt 26 passed through rear and lower ends of the plates 14—15. The sleeve is thus arranged for swinging movements in an upright longitudinal plane between said plates.

To accomplish such swinging movements of the sleeve member 24 I provide an operating lever 27 which passes between the plates 14—15 immediately to the rear of the beam 10 and which is swingably mounted by a yoke 28 consisting of forwardly diverging arms 29 secured, as by welding, to the lever between the spaced side bars 30 thereof, and which arms at their forward ends are pivotally mounted upon the uppermost mounting bolt 16. This yoke permits free swinging movements of the lever 27 in an upright longitudinal plane and the lower end of the lever is turned forwardly and apertured, as at 31, to pivotally receive the forward end 32 of a link 33. The rear end portion of this link extends alongside the sleeve 24 and is pivoted thereto by means of an apertured ear 34 formed on the sleeve. Clearance for the link alongside the sleeve may be provided in any suitable manner, such as by offsetting the rear end portion of one plate 15, as designated at 15a.

The usual power lift or main crank axle operated lift for such plows includes a rearwardly extending rear wheel raising bar 35 which is power actuated to move forwardly when raising the plow and rearwardly when lowering it. Said bar 35 is bifurcated at its rear end 36 to receive the upper end of the operating lever 27 and a pin 37 is pivoted through said lever end plays freely in longitudinally extending slots 38 in the bar.

It will be evident that the weight of the rear end of the plow resting upon the furrow wheel 19 will cause it to have a tendency to move upwardly, swinging about the pivot point 26, and the resulting forces exerted on the link 33 will act to swing the upper end of lever 27 rearwardly. A stop 60 extending between the plates 14—15 may engage sleeve member 24 to limit this movement as will be readily apparent. At the same time the forward elongation of the slots 38 will permit the upward movements of the plow relative to the rear wheel as is necessary when the plow body or bodies meet with an obstruction in the ground and are raised thereby. This relative floating action of plow and wheel is very necessary in the operation of such plows.

Now when the bar 35 is pulled forward by the lifting mechanism the lever 27 is oscillated about its pivot on the bolt 16 swinging its lower end rearwardly and exerting a thrust force on link 33 sufficient to oscillate the sleeve 24 about pivot 26 and swing the wheel downwardly and forwardly relative to the plow. Such movement will, of course, raise the rear end of the plow by a substantial amount as will be evident in Fig. 4.

The axle end 23 extends through and beyond the sleeve 24 and on its extended extremity there is secured a head member 39 which supports two pins 40—41 upon which are journaled the guide rollers 42—43. The axle is prevented from axial movement through this sleeve 24 by said head 39 and by a collar 44 on the axle at the lower end of the sleeve. The rollers 42—43 are so arranged that, in plowing position of the parts, they will rest between and contact inner surfaces of the plates 14—15 and these rollers being spaced at opposite sides of the axis of the axle end 23 they will thus prevent any oscillating or rotating movements of the axle in the sleeve. However, when the rear wheel 19 is moved downwardly and forwardly to raise the plow to transport position the upward and rearward movement of the sleeve 24 about pivot 26 will carry the rollers 42—43 clear of the plates and the axle end 23 may then turn freely in the sleeve.

The shape of the axle 21 is such that a pronounced bend is formed at 45 beneath and to the rear of the sleeve 24 in both the vertical and horizontal planes and thus the wheel when in transport position (Fig. 4) will have a castering action about its then substantially upright end 23 in the sleeve. Such action will in no way be interfered with by the rollers 42—43 as the head member 39 may turn freely with the axle and this castering action may obtain through a complete, three-hundred and sixty degree turn as will be readily evident. On the other hand the normal tendency of the wheel to turn laterally from its course in plowing position, due to the angularity of its axis, will be prevented by the lateral engagement of the rollers 42—43 with the side plates 14 and 15 as will also be evident.

The axle shape and action as above described also has another function and effect as will be pointed out later herein.

Attention is directed to the fact that the normally forwardmost roller 42, or the leading roller which will first enter the space between the plates 14—15 as the plow is moved to plowing position, is smaller in diameter than is the other or trailing roller 43. This differential in size will obviously aid in the proper guidance of the rollers to locking position between the plates should the wheel be castered slightly to one side or the other. However the rollers are concentrically disposed with respect to the pivot about which the sleeve 24 swings, the shape of the head member 39 being such that the rollers are located equal distance from the pivot 26. As the rollers then swing into and out of the space between the plates 14—15 they will follow an arcuate path about center 26. The inner surfaces of the plates 14—15 along the path followed by the rollers are arcuately grooved or channeled as designated at 46 so that the clearance between the grooves in the respective plates will loosely receive the smaller roller 42 and just nicely receive and engage the larger roller 43, the space between the plates themselves being thus too little to accommodate the larger roller.

The purpose of the foregoing structure may be readily understood from a study of Figs. 3 and 4. As stated heretofore the wheel may caster a full three-hundred and sixty degrees when in transport position and accordingly after the plow has been moved rearwardly and it is again desired to return it to plowing position, the wheel may very likely be forwardly castered to the position shown in dotted lines in Fig. 4. In such case the larger roller 43 will then be turned forwardly, as in Fig. 3, but since the head member 39 is now reversed the rollers are eccentrically located about the pivot 26 and the roller 43 will thus obviously contact the plates 14—15 rearwardly of the guideway or channel formed by and between the grooves 46 as the plow starts to lower. Being too large to enter between the plates this roller 43 will then roll off to one side or the other causing the wheel to caster around towards the rear until the smaller roller 42 is again in leading position to enter between the plates as the lowering action takes place. The larger roller 43 will not in any case center itself or lodge between the plates since the angularity of the wheel axle 21 will give it a definite tendency to roll off to the side of the plates under influence of the weight and movement of the plow. The upper ends of the grooves 46 may be flared laterally as indicated at 47 to facilitate the entrance of the rollers thereinto.

The rear wheel 19 for best operation must cant or lean to a rather sharp angle upwardly and laterally away from the furrow wall in plowing position but should be moved to a more upright position when transporting to facilitate its castering action. As shown in the drawings in Figs. 2 and 6 the angle is changed from approximately 50 degrees in plowing position to about 86 degrees in transport position, thus achieving this very desirable effect to a marked degree. Such action results from the peculiar and novel relative angle between the axis of rotation of the wheel and the plane of movement of the sleeve 24 in which raising and lowering adjustments take place and is also a concomitant result of the free castering action in transporting positions. In plowing the pintle portion 22 of the axle assumes the position shown in Fig. 2, angling downwardly away from the furrow wall. As the axle 21 is then swung forwardly and downwardly to lift the plow the wheel will first have a tendency to lead to the left or land side (viewing the plow from the rear) but as it reaches transport position the axle becomes free to caster and then rotates slightly in the sleeve 24, in a clockwise direction viewed from above the plow, so that the pintle portion 22 attains a more horizontal position as seen in Fig. 6.

In other words the transverse inclination of the pintle 22, and consequently the tilt of the wheel 19 from vertical, will change as the wheel is lowered from its raised plowing position (Figs. 1 and 2) to the transport position (Figs. 4 and 6), since the rollers 42—43 are no longer restricted by the plates 14—15 and the angular construction of the shaft 22—21—23 permits free castering as will be evident from Figs. 4 and 6. In this connection it may be noted that while the pintle portion 22 of the shaft is practically at right angles to the longer intermediate portion 21 the latter is angularly offset from the swiveled portion 23 laterally so that the point of wheel contact with the ground will be in substantially the longitudinal vertical plane through the axis of bearing 24. This fact, coupled with the further fact that the shank 21 is substantially angled rearwardly with respect to the journaled portion 23, as shown in Fig. 4, produces the free castering condition desired in transport of the plow. Nor does this shaft conformation in any way interfere with the operation of the device while plowing. On the contrary it will be evident that when wheel 19 is raised (i. e. to lower the plow) the rollers 42—43 will enter between the plates 14—15 and be firmly held thereby to hold the furrow wheel at the desired angle shown in Fig. 2, where it will properly contact the side wall of the furrow while holding the hub and shaft parts free of contact therewith.

A feature of the construction thus far described, contributing much to efficient performance, is the overcoming of twisting action or torque on the wheel and axle as the rollers 42—43 enter locked position between the mounting plates. At the stage at which such action would occur the roller 42 is entering the grooves 46 and the axis A—B (Fig. 1) passes through the point C at the bottom of the wheel thus eliminating such torque, reducing side pressure between the roller and the inner surfaces of the grooves, and leaving the roller floating free as it enters between the plates. Any small torque occurring before the axis A—B moves through point C, such as caused by the skidding of the wheel in making a turn during the time the plow is being lowered, may readily be overcome by the guiding effect of the smaller roller as it approaches and enters between the grooves.

Both rollers 42—43 are arranged to enter locked position before the plow enters the ground so that the larger roller has complete locking effect on the wheel during all plowing operations.

The purpose of turning the lower end of operating lever 27 forwardly and locating the pivot ear 34 on the rear of the sleeve 24 is to provide a desirable lever action such that the effective lever acting on the rear wheel axle becomes shorter as the plow approaches raised position. The lever is moved at a constant rate by the power lift which raises the forward part of the plow at a certain speed depending upon the characteristics of the lift. As a result of this variation of the leverage of the lever the rear end of the plow will lift first slower relative to the forward lift and then more rapidly as it approaches transport position. As the plow is lowered the rear end falls first rapidly and then slower as it approaches plowing position.

The effect is, in raising, to cause the points of the plow bodies to tilt upwardly at first, giving them a tendency to run out of the ground and greatly facilitating the lifting operation as will be understood. In lowering, the plow heels are caused to strike the ground first to prevent any possibility of damage to the points from contact with the ground.

Attention is now directed particularly to Figs.

7 and 8 wherein it will be noted that the various openings in the plates 14—15, accommodating the mounting bolts 16, 17 and 18, are all larger than the bolts, thus providing for some freedom of movement of the plates relative to the supporting plow beam 10 when the bolts are loosened. By movement and adjustment of these plates then the angle of the plow bodies in both vertical and horizontal planes may be varied as will now be described.

The uppermost bolt 16 has rotatably mounted at one end, within its nut 48, a cam 49 which may be turned about the axis of the bolt in the opening 50 in the adjacent plate 14. This cam, being eccentric to the bolt, will when turned cause the plates 14—15 to be moved upwardly and downwardly effecting an adjustment of the entire mounting assembly in a vertical plane about an axis W—X. The result is to raise and lower the wheel 19 slightly thus varying the longitudinal vertical inclination of the plow and enabling the points of the plow bodies to be lowered somewhat and cause to have increased suction or increased tendency to run into the ground.

The lower bolt 18 also carries a cam 51 inwardly of its nut 52 and which cam is eccentric to the bolt axis and is movable thereabout in the opening 53 in the plate 15. Adjustment of this cam 51 in the opening 53 will enable the plate 15 to be moved rearwardly or forwardly somewhat, causing a shifting of the mounting structure in the horizontal plane about the axis Y—Z. Such action will vary the land pressure, or the pressure of the plow bodies against the furrow wall, since it in effect shifts the rear wheel laterally with respect to the plow bodies.

Both cams 49 and 51 have large heads 54 faced off to receive a wrench for turning them and which heads will be engaged by the nuts 48 and 52 to lock the cams once they are adjusted and the bolts retightened. There will of course be a minor vertical component of all such adjustments but this will not interfere with the limited horizontal movements required in actual operation.

Attention is directed to the fact that both upward and downward floating movements of the wheel are permitted by the play of the pin 37 in the slots 38 to thus greatly facilitate the maintenance of the selected plowing depth in uneven fields. Upward movements of the wheel may be gauged by turning cam 49 to swing the rear ends of plates 14—15 up or down and thereby bring the stop means 60 nearer to or further away from the sleeve member 24. In this case the rear wheel will control the slant or suction of the plow bodies, but gauge shoes on the bodies (not shown) may also be used in the usual manner. Plowing depth is of course controlled by the large front wheels of the plow.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A rear furrow wheel structure for a plow, comprising a pair of rigid side members on the plow forming the sides of a laterally confined guideway, a member pivotally mounted in said guideway, a furrow wheel axle connected at one end to said member and supported thereby for up and down movements at its other end, a furrow wheel supported by said other end of the axle and movable thereby to raise and lower the plow, said axle having a swivel connection with said member to permit castering action of the wheel in the raised position of the plow, and said axle carrying a locking member adapted to enter said guideway and engage the opposite sides thereof as the plow is lowered to lock the axle against such castering action in any direction.

2. In a plow, a rear furrow wheel supporting structure, comprising rigid members on the plow forming a laterally confined guideway, a member pivoted in said guideway for swinging movements in a generally upright plane, a furrow wheel axle having one end swiveled in said member and supported thereby for movements from a rearwardly trailing position downwardly toward a generally upright position, a furrow wheel supported on said axle and adapted for castering movements as the axle swivels in said upright position of the axle, a roller on said journaled end of the axle adapted to enter said guideway as the axle swings toward its trailing position to restrain the axle and wheel against castering movements, and said roller being so positioned on the axle that the roller will be carried clear of the guideway as the axle moves to upright position to permit castering action of the wheel.

3. In a plow, a rear furrow wheel supporting structure, comprising rigid mounting members on the plow and forming an upright guideway, a member pivoted in said guideway, a furrow wheel axle supported by said member for up and down swinging movements from a rearwardly trailing position downwardly to a substantially upright position, a furrow wheel on the axle, the said axle being pivotally mounted in said member to permit castering movements of the wheel in said upright position of the axle, a pair of rollers mounted on the axle and adapted to enter the guideway between said mounting members as the axle approaches said trailing position and operative to restrain the wheel against castering movements, one of said rollers being smaller than the other and so positioned that it will enter the guideway first and guide the other roller thereinto, and said other and larger roller being adapted to laterally contact the upright sides of the guideway.

4. In a plow, a rear furrow wheel supporting structure, comprising rigid mounting members on the plow and forming an upright guideway, a member pivoted in said guideway, a furrow wheel axle supported by said member for up and down swinging movements from a rearwardly trailing position downwardly to a substantially upright position, a furrow wheel on the axle, the said axle having an end portion journaled through the said member whereby the furrow wheel may caster freely when in upright position, a pair of rollers connected to the said end portion of the axle and adapted to enter the guideway and restrain the furrow wheel against castering movements in the trailing position of the axle, one of said rollers being smaller than the other and adapted to enter the guideway first as the axle swings toward said trailing position.

5. The combination with a plow, of a rear furrow wheel structure, comprising a pair of mounting plates secured to the plow in spaced relation, a bearing member pivotally supported between the mounting plates for vertical swinging movements, a wheel supported axle swiveled in the bearing member and swingable therewith to raise and lower the plow, the said axle having a portion adapted to swing between the mounting plates in one position of the plow, and locking means on this portion of the axle for engaging the adjacent sides of the mounting plates for locking the axle against opposite swiveling movements in the bearing member when said axle portion is disposed between the said plates.

6. In a caster wheel mounting for an implement frame, a pair of spaced plates secured to the implement, a bearing member pivotally supported between the plates for vertical swinging movements, a wheel supported axle swiveled in the bearing member and adapted to be moved vertically with respect to the implement as the bearing member swings, one end of the axle being extended from the bearing member and arranged to swing toward and away from the space between the plates, a head member on this end of the axle, and means on the head member offset with respect to the axis of the swivel connection of the axle and bearing member and adapted to enter the said space between the plates and laterally and oppositely engage the plates for locking the axle against swiveling movements.

7. A rear furrow wheel structure for a plow, comprising a mounting member secured to the plow and having spaced sides, a bearing member pivotally supported on the mounting member for vertical swinging movements, a furrow wheel, an axle supportably connected at one end to the wheel and swiveled at its other end in the bearing member, the said axle being swingable by said bearing member from a rearwardly trailing position downwardly to a depending castering position to raise the plow, a locking member carried by the axle and disposed in lateral confinement between the sides of the mounting member in the raised position of the axle to restrain the axle against caster movement but swingable clear of said sides as the axle is swung downwardly to thereby free the axle for caster movements about a substantially upright axis, the said locking member comprising a roller of a diameter greater than the space between the sides of the mounting member and said sides on their inner surfaces having channels to receive the roller, and the said roller being so mounted that it will be aligned with the channels only when the axle is castered to a certain position relative to the bearing member.

8. The combination with a plow, of a rear furrow wheel structure therefor, comprising a bearing member connected to the plow for vertical swinging movements, an axle journaled in the said bearing member, a rear furrow wheel journaled on the axle, said axle being swingable upwardly and downwardly to lower and raise the plow respectively and being capable of swivel movements in the bearing member when the plow is raised to permit the axle and wheel to caster in forward or rearward directions, a locking member carried by the axle and including a roller, means forming a guideway adapted to receive the roller in the lowered position of the plow to restrain the axle against castering movements, and the said roller being so disposed and arranged that it will enter the guideway only when the axle is in a certain position in the bearing member.

9. The combination with a plow, of a rear furrow wheel structure therefor, comprising a bearing member connected to the plow for vertical swinging movements, an axle journaled in the said bearing member, a rear furrow wheel journaled on the axle, said axle being swingable upwardly and downwardly to lower and raise the plow respectively and being capable of swivel movements in the bearing member when the plow is raised to permit the axle and wheel to caster in forward or rearward directions, a locking member carried by the axle and including a roller, a member on the plow having an arcuate guideway concentric with the pivot axis of the bearing member, and said roller being so mounted on the axle that it will vary in distance from the pivot axis of the bearing member in various castered positions of the axle and will enter the said guideway only in a selected position of the axle.

10. The combination with a plow, of a rear furrow wheel structure therefor, comprising a bearing member connected to the plow for vertical swinging movements, an axle journaled in the said bearing member, a rear furrow wheel journaled on the axle, said axle being swingable upwardly and downwardly to lower and raise the plow respectively and being capable of swivel movements in the bearing member when the plow is raised to permit the axle and wheel to caster in forward or rearward directions, a locking member carried by the axle and including a roller, a mounting member rigidly supported from the plow and having a guideway adapted to receive and laterally engage the roller in the lowered position of the plow, the said roller being so mounted and arranged that it will enter said guideway only when the axle and wheel are castered toward the rear and in other positions will downwardly engage the mounting member and roll off to one side or the other thereof to thereby urge said axle toward its said rearwardly castered position.

11. In a rear wheel structure for a plow, an axle, a wheel journaled on one end of the axle, means connecting the axle at its other end to the plow for up and down swinging movements to raise and lower the wheel, means also supporting the axle for castering movements of the wheel in its lowered position, locking means cooperating with the axle for locking the wheel against castering movements in its raised position, said axle having a bent end upon which the wheel is journaled and said end being so disposed that in the lowered position the wheel will rest in a substantially upright position, and said locking means having guiding engagement with the axle to turn the axle and cant the wheel to one side when the wheel reaches its raised and locked position.

12. A rear wheel mounting for a plow beam, comprising a pair of plates arranged with their forward ends at opposite sides of the beam, a wheel supported axle operatively mounted to the rear ends of the plates, bolts securing the plates to the beams, and cam means cooperating with the bolts and the plates for shifting the plates in a generally transverse horizontal direction at their rear ends.

13. The combination in a plow, of a furrow wheel structure comprising a bearing member supported on the plow for up and down swinging movements with respect thereto, an axle journaled in the bearing member, a furrow wheel journaled on the axle, said axle being swingable upwardly and downwardly to lower and raise the plow respectively and being capable of swivel movements in the bearing member when the plow is raised to permit castering movements of the axle and wheel, a locking member carried by the axle and including a roller, a member on the plow forming a laterally confined guideway adapted to receive the said roller, and said roller being so mounted on the axle that it will vary in distance from the pivot of the bearing member in various castered positions of the axle and will enter the guideway only in a selected position of the axle.

14. In a plow, a rear furrow wheel supporting structure, comprising rigid members on the plow forming a laterally confined guideway, a member pivoted in said guideway for swinging movements in a generally upright plane, a furrow wheel axle having one end swiveled in said member and supported thereby for swinging movements in a generally upright plane, a furrow wheel on the axle and adapted for castering movements as the axle swivels in the said pivoted member, and at least two rollers supported on the journaled end of the axle and adapted to enter the said guideway as the axle swings upwardly and to laterally engage the guideway to restrain the axle against castering movements.

15. In a plow, a supporting structure for the rear furrow wheel of the plow, comprising a pair of spaced mounting members extended from a rigid part of the plow and attached at forward ends to said part, means rigidly connecting the members, an axle for connecting to the furrow wheel and having an end mounted at the rear ends of the mounting members for up and down and castering movements with respect thereto, means at the forward ends of the mounting members for adjusting them in generally upward and downward directions at their rear ends, and means at the forward ends of the members for also adjusting them transversely in generally horizontal planes at their rear ends.

WILLIAM R. FRANK.